E. V. LAMBETH.
LUBRICATOR.
APPLICATION FILED JUNE 4, 1912.
1,069,437.
Patented Aug. 5, 1913.
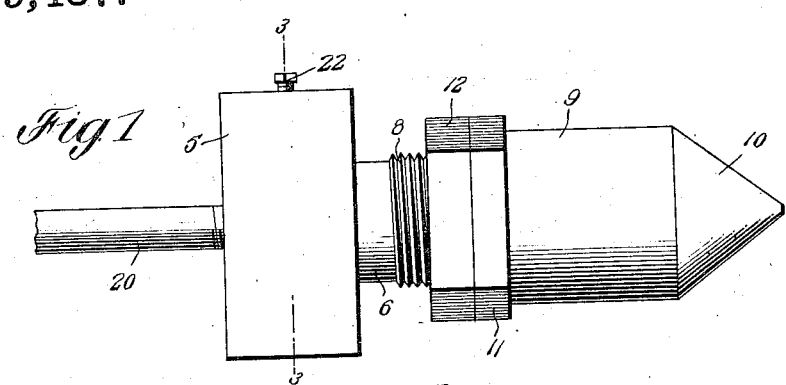
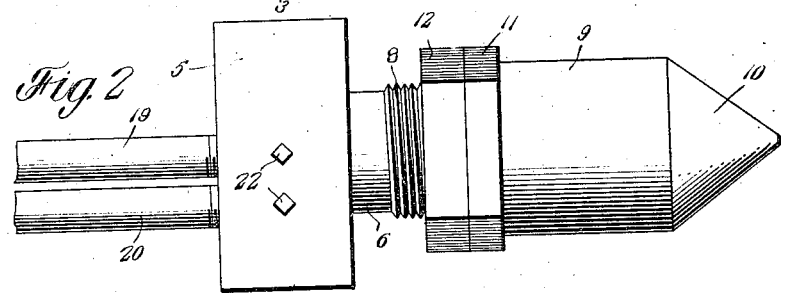
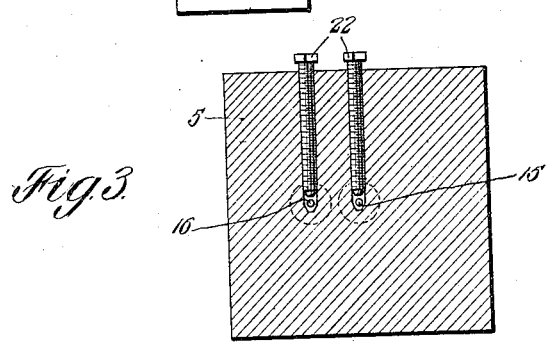
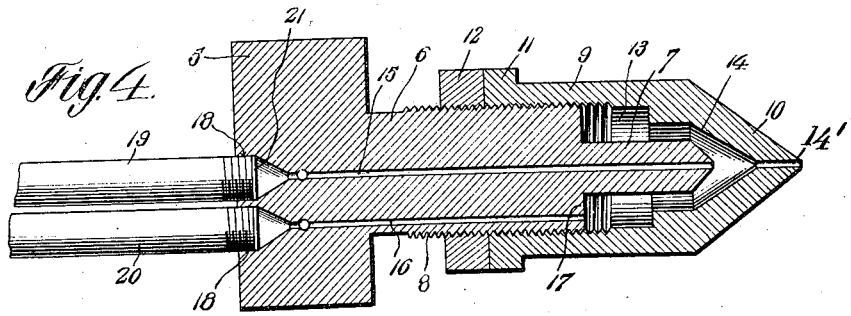
Inventor
E. V. Lambeth,
Witnesses
J. H. Crawford
By Victor J. Evans
Attorney

UNITED STATES PATENT OFFICE.

EDGAR V. LAMBETH, OF BIRMINGHAM, ALABAMA.

LUBRICATOR.

1,069,437.     Specification of Letters Patent.     Patented Aug. 5, 1913.

Application filed June 4, 1912. Serial No. 701,582.

*To all whom it may concern:*

Be it known that I, EDGAR V. LAMBETH, a citizen of the United States, residing at Birmingham, in the county of Jefferson and State of Alabama, have invented new and useful Improvements in Lubricators, of which the following is a specification.

The invention relates to lubricators, and more particularly to the class of atomizing lubricators.

The primary object of the invention is the provision of a device of this character in which lubricant will be atomized irrespective of the density thereof without the possibility of the clogging of the ports therein thus avoiding the necessity of disjoining the supply pipes or any of its parts and thereby assuring a perfect working of the device.

Another object of the invention is the provision of a lubricator in which either compressed air or active fluid such as steam will be utilized for disbursing a lubricant for the atomizing of the same, whereby it may be used for lubricating purposes at any desired point in machinery or the like, the device being adjustable, so as to regulate the distribution of the lubricant from the device and which latter will be rendered devoid of clogging, thereby assuring perfect lubrication during the working of the said device.

A further object of the invention is the provision of a lubricating device of this character which is simple in construction, thoroughly reliable and efficient in its operation, possessing few parts, and inexpensive in manufacture.

With these and other objects in view the invention consists in the construction, combination and arrangement of parts hereinafter more fully described, illustrated in the accompanying drawing, and pointed out in the claims hereunto appended.

In the drawing: Figure 1 is a side elevation of a lubricating device constructed in accordance with the invention. Fig. 2 is a top plan view thereof. Fig. 3 is a fragmentary sectional view on the line 3—3 of Fig. 1. Fig. 4 is a transverse longitudinal sectional view through the device.

Similar reference characters indicate corresponding parts throughout the several views in the drawing.

Referring to the drawing by numerals the lubricator comprises a valve body 5, preferably of cubical shape, although the same may be made in any other shape desired, formed with a nozzle 6 projecting outwardly from one side of the same, the said nozzle being formed with a reduced central outward projecting tip 7 having a tapered extremity and also being provided with external threads 8 for the detachable mounting thereon of a cap 9, the same being formed with an outer cone-shaped end 10, while its inner end is formed with a flat faced wrench engaging rib or flange 11, whereby the said cap 9 can be turned for the adjustment thereof on the nozzle 6, the inner surface of the cap 9 being threaded correspondingly to the threads 8 on the nozzle 6, so that the cap can be readily adjusted thereon.

Surrounding the nozzle at the threaded end 8 thereof and adjustably engaging the latter is a locking collar or nut 12 which works against the flanged end 11 of the cap 9 for the locking of the same in adjusted position. The cap 9 is formed with a recess 13 for a portion of its length, of a size corresponding to the cross sectional diameter of the nozzle 6 to provide a chamber concentrically about the tip for communication with the passage 16 at the side of said tip, while the remaining portion of the said cap is formed with an outwardly tapered pocket 14, the larger end of the pocket being of less size than the said recess and communicating with the same, and also through the apex of the outer cone-shaped end 10 of the said cap extends an aperture 14′ which communicates with the smaller end of the pocket 14 to aline with the passage 15 so that lubricant admitted in the bores 15 and 16 can be discharged from the cap 9 through the cone-shaped end 10 thereof in a manner presently described.

Formed in the body 5 and extending through the nozzle 6 are spaced parallel passages 15 and 16 respectively; the outer end of the passage 15 opening through the outer end of the tip 7, while the outer end of the passage 16 opens at one side of the tip through the shoulder 17 formed in the nozzle 6 at the inner end of the tip 7, the inner ends of the said passages 15 and 16 being in communication with internally threaded sockets 18 opening through the side of the body 5 opposite the nozzle 6 and in these sockets 18 are engaged supply pipes 19 and 20 respectively, the pipe 19 being designed to admit compressed air to the passage 15, while the pipe 20 is designed to admit lubricant to the passage 16 whence the lubricant will be sucked into the bores 13 and 14 in the cap 9 as the compressed air is discharged through the cone-shaped end 10 of the said cap to the atmosphere, and in this manner the oil is ejected from the said cap during the discharge of the air therethrough.

Located within the sockets 18 are strainer disks 21 which intersect the flow of fluid through the pipes 19 and 20, so as to prevent the entrance of foreign matter into the passages 15 and 16 when such fluid is let into the same.

Threaded in the body 5 through the top thereof and adapted to intersect the passages 15 and 16 are cut-off regulating plugs 22 which are adapted to control the quantity of fluid passing through the passages 15 and 16 so as to regulate the lubricator. These cutoff or regulating plugs 22 can be located in the body of the lubricator as shown, or the same can be placed within the pipes 19 and 20 at any point between the lubricant reservoir and the body of the lubricator for controlling the fluid passing through the said pipes.

In the operation of the device the plugs 22 are adjusted for regulating the supply of fluid admitted thereinto and by reason of the introduction of compressed air or steam into the passage 15 it will induce the lubricant in the passage 16 to freely flow therethrough, and be forced outwardly with the air or steam through the cone-shaped end 10 of the cap 9 to the exterior thereof or to the atmosphere.

From the foregoing description, taken in connection with the accompanying drawing, it is thought that the construction and operation of the invention will be clearly understood, and therefore, a more extended explanation has been omitted.

What is claimed is:—

1. A lubricator comprising a solid body having a circular shaped externally threaded nozzle provided with a central outwardly projecting tip having a tapered extremity, the said body being provided with spaced passages, one of said passages opening through the tapered tip and the other passage opening through the nozzle at one side of the tip, supply pipes connected with the body and communicating with said passages, and a cap adjustably engaging the threaded nozzle and formed with a recess having a diameter corresponding to the cross sectional diameter of the nozzle to provide a chamber concentrically about the tip for communication with the passage at one side of the tip, the said cap being further provided with an outwardly tapering pocket having its larger end of less size than the recess and communicating with the same, the said cap being still further provided with a central aperture opening through the outer end thereof and communicating with the small end of the tapered pocket and being in alinement with the other passage.

2. A lubricator comprising a solid body having a circular shaped externally threaded nozzle provided with a central outwardly projecting tip having a tapered extremity, the said body being provided with spaced passages, one of said passages opening through the tapered tip and the other passage opening through the nozzle at one side of the tip, supply pipes connected with the body and communicating with said passages, a cap adjustably engaging the threaded nozzle and formed with a recess having a diameter corresponding to the cross sectional diameter of the nozzle to provide a chamber concentrically about the tip for communication with the passage at one side of the tip, the said cap being further provided with an outwardly tapering pocket having its larger end of less size than the recess and communicating with the same, the said cap being still further provided with a central aperture opening through the outer end thereof and communicating with the small end of the tapered pocket and being in alinement with the other passage, and a lock nut adjustably engaging the screw threads on the nozzle and working against the inner end of the cap to sustain the same in adjusted position.

In testimony whereof I affix my signature in presence of two witnesses.

EDGAR V. LAMBETH.

Witnesses:
THOS. G. MCEVER,
JAMES M. BIBBY.

---

Copies of this patent may be obtained for five cents each, by addressing the "Commissioner of Patents, Washington, D. C."